US009451642B2

(12) United States Patent
Vang et al.

(10) Patent No.: US 9,451,642 B2
(45) Date of Patent: Sep. 20, 2016

(54) METHOD AND SYSTEM FOR SECURING IN-VEHICLE COMMUNICATION WITH A PORTABLE DEVICE USING NFC

(71) Applicant: DENSO International America, Inc., Southfield, MI (US)

(72) Inventors: Doua Vang, Waterford, MI (US); Bilal Alasry, Dearborn, MI (US)

(73) Assignee: Denso International America, Inc., Southfield, MI (US)

( * ) Notice: Subject to any disclaimer, the term of this patent is extended or adjusted under 35 U.S.C. 154(b) by 148 days.

(21) Appl. No.: 13/956,718

(22) Filed: Aug. 1, 2013

(65) Prior Publication Data

US 2015/0038073 A1    Feb. 5, 2015

(51) Int. Cl.
     *H04B 5/06*      (2006.01)
     *H04W 76/02*      (2009.01)
     *H04W 4/00*      (2009.01)
     *H04W 12/08*      (2009.01)
     *H04W 84/18*      (2009.01)

(52) U.S. Cl.
     CPC ............. *H04W 76/02* (2013.01); *H04W 4/008* (2013.01); *H04W 12/08* (2013.01); *H04W 84/18* (2013.01)

(58) Field of Classification Search
CPC ............. G06F 21/10; H04L 2209/603; H04L 2209/80; H04L 9/321; H04L 63/0861; H04W 12/08; H04W 48/02; H04W 48/16; H04W 4/008
USPC .............. 455/518, 519, 410, 411, 569.2, 345
See application file for complete search history.

(56) References Cited

U.S. PATENT DOCUMENTS

| | | | | |
|---|---|---|---|---|
| 7,747,218 B2* | 6/2010 | Sasai | ................... | H04L 63/0492 455/41.1 |
| 8,861,540 B2* | 10/2014 | Wu | ....................... | H04L 12/581 370/350 |
| 8,913,994 B2* | 12/2014 | Edwards | ................. | H04L 51/12 455/410 |
| 9,079,535 B2* | 7/2015 | Miyazaki | ................ | B60R 5/044 |
| 2010/0202346 A1* | 8/2010 | Sitzes | ................... | H04W 84/18 370/328 |
| 2010/0216401 A1* | 8/2010 | Kitahara | ............. | H04M 1/6091 455/41.2 |
| 2011/0287718 A1* | 11/2011 | Abel | ..................... | H04B 5/0031 455/41.1 |
| 2012/0040665 A1* | 2/2012 | Liu | ....................... | H04W 4/008 455/426.1 |
| 2013/0121502 A1* | 5/2013 | Fujii | ...................... | H04R 27/00 381/77 |
| 2014/0114504 A1* | 4/2014 | Yamashita | .............. | B60R 25/40 701/2 |
| 2014/0143841 A1* | 5/2014 | Karaoguz | .............. | G06F 21/10 726/4 |
| 2014/0302774 A1* | 10/2014 | Burke | .................... | H04H 20/57 455/3.05 |
| 2014/0368475 A1* | 12/2014 | Spahl | ....................... | G06F 3/02 345/184 |
| 2015/0128240 A1* | 5/2015 | Richards | ............. | H04L 63/0861 726/7 |
| 2015/0149042 A1* | 5/2015 | Cooper | .................. | E05F 15/77 701/48 |

* cited by examiner

*Primary Examiner* — Ayodeji Ayotunde
*Assistant Examiner* — Max Mathew
(74) *Attorney, Agent, or Firm* — Harness, Dickey & Pierce, P.L.C.

(57) ABSTRACT

A method for securing wireless communication between an in-vehicle system and multiple portable devices brought into a vehicle. The method can include receiving a communication request from a portable device, and determining whether a primary device has authorized wireless communication between the in-vehicle system and the portable device requesting communication, where such authorization can be provided via near field communication (NFC). The method can further include establishing wireless communication between the in-vehicle system and the portable device requesting communication when the portable device requesting communication is the primary device, and when the portable device requesting communication is a secondary device and the primary device has authorized wireless communication via NFC.

7 Claims, 10 Drawing Sheets

METHOD AND SYSTEM FOR SECURING IN-VEHICLE COMMUNICATION WITH A PORTABLE DEVICE USING NFC

FIELD

The present disclosure relates to a method and a system for securing in-vehicle communication with a portable device using near field communication (NFC).

BACKGROUND

This section provides background information related to the present disclosure which is not necessarily prior art. Vehicles often include a system for wirelessly communicating with portable devices, such as smartphones, which are brought into the vehicle. Such systems may wirelessly communicate with a portable device by way of a Bluetooth communication link. Conventional protocols for establishing a communication link via Bluetooth may first pair the system with the portable device by using a pin code to authenticate the portable device requesting the wireless connection. Once the pin code is authenticated and a media access control (MAC) address is saved by both the system and the portable device, pairing is complete and the system and the portable device can automatically establish wireless communication when the two are within communication range (i.e., the portable device is brought into the vehicle).

Once a Bluetooth communication link is established, the portable device can access the system and perform a variety of functions via various Bluetooth profiles. For example, a hands free function allows an occupant to place or receive calls via the portable device by using a microphone and a speaker disposed in the vehicle. Also, the occupant can wirelessly stream and listen to audio files provided by the portable device through a vehicle audio system.

Portable devices brought into the vehicle by, for example, a guest, who may not be the primary user of the vehicle, may also wirelessly communicate with the system. Thus, allowing the guest to access the system to, for example, play music or even download information. As a result, once paired with the system, the portable device belonging to the guest may now automatically establish wireless communication with the system without the knowledge of the primary user.

SUMMARY

This section provides a general summary of the disclosure, and is not a comprehensive disclosure of its full scope or all of its features.

The present disclosure provides for a method for securing wireless communication between an in-vehicle system and multiple portable devices brought into a vehicle. The method includes receiving a communication request from a portable device (i.e., a requesting portable device), and determining whether a primary device has authorized wireless communication between the in-vehicle system and the portable device requesting communication. The primary device can be a portable device that is registered in a primary device registry as the primary device, whereas a portable device not registered in the primary device registry can be a secondary device.

The method can further include establishing wireless communication between the in-vehicle system and the portable device requesting communication when the portable device requesting communication is the primary device, and when the portable device requesting communication is the secondary device and the primary device has authorized wireless communication.

The authorization from the primary device can be received using near field communication (NFC) via a NFC sensor. For instance, the method can include receiving a device ID unique to the portable device from the NFC sensor, and comparing the device ID received from the NFC sensor to device IDs provided in the primary device registry, which has device IDs of the portable devices registered as the primary device. The method determining the primary device has authorized wireless communication when the device ID received from the NFC sensor is registered in the primary device registry. Thus, the method establishes wireless communication between the in-vehicle system and the secondary device when the primary device authorizes the wireless communication via NFC.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
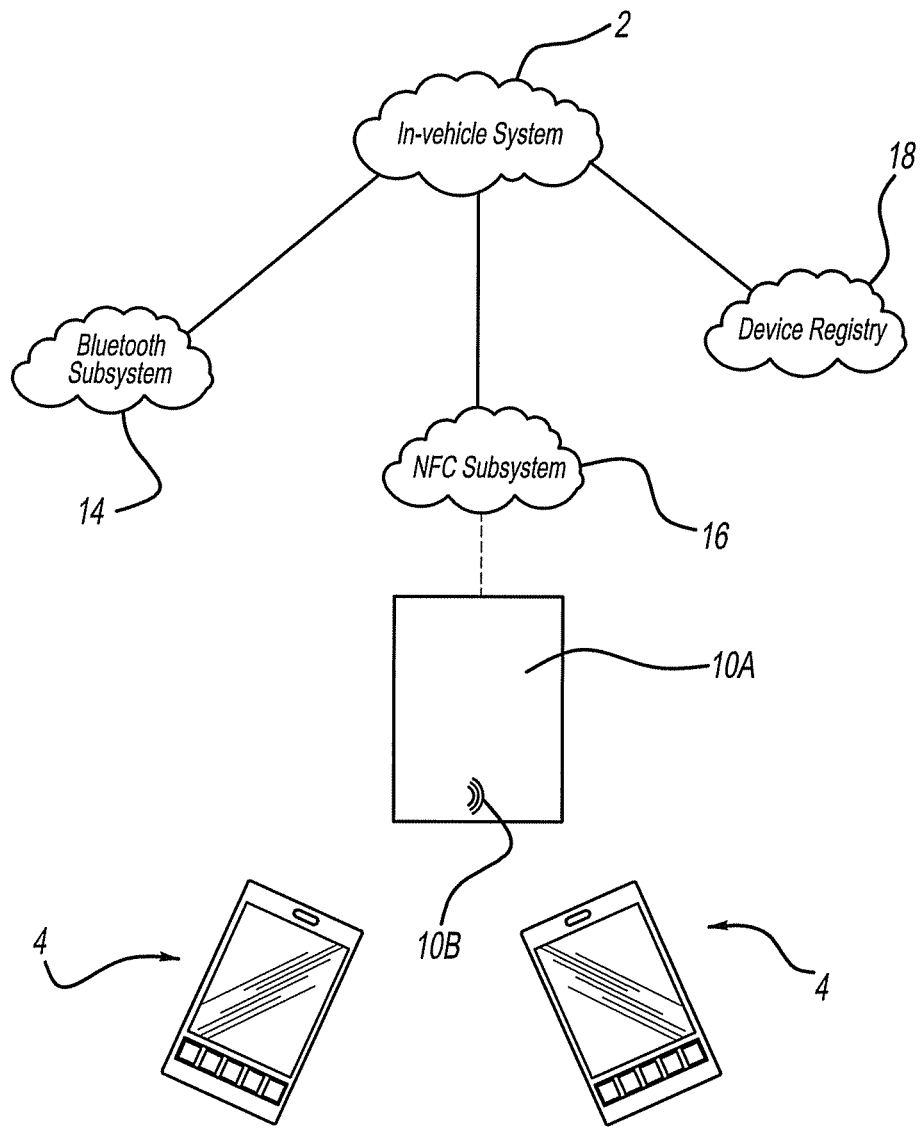
FIG. 1 illustrates an in-vehicle system in a first embodiment, which is within a communication range of multiple portable devices brought into a vehicle having the in-vehicle system of the present disclosure.
Figure 2:
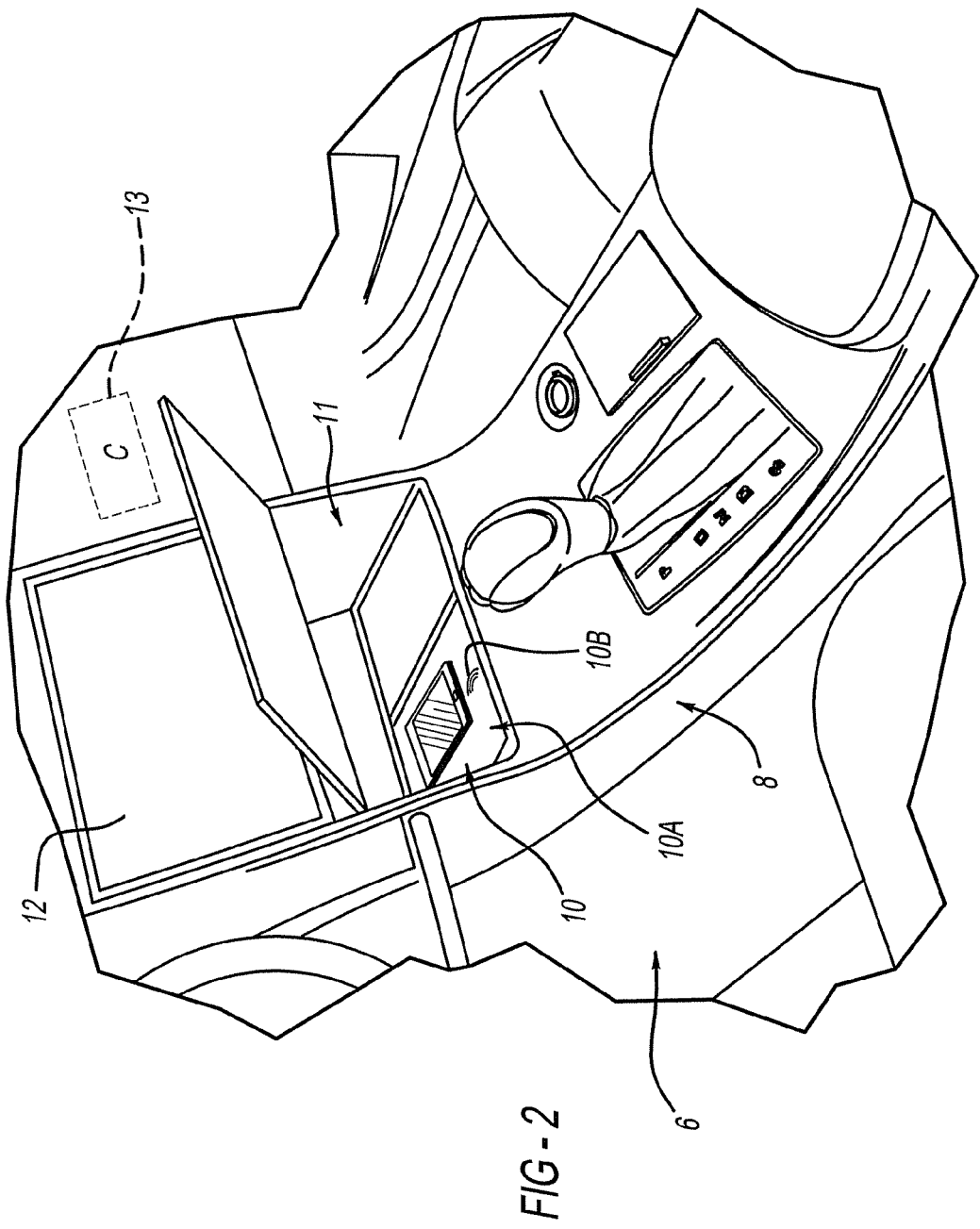
FIG. 2 illustrates a center console of the vehicle with a near field communication pad.

Example embodiments will now be described more fully with reference to the accompanying drawings. With reference to FIGS. 1 and 2, an in-vehicle system 2 can communicably couple to one or more portable devices 4 brought inside a passenger cabin 6 of a vehicle via wireless communication. Wireless communication can be performed using various techniques such as Bluetooth and near field communication (NFC).

The passenger cabin 6 having a center console 8 is depicted in FIG. 2. The center console 8 includes a communication pad 10 and a display 12. The communication pad 10 can be disposed in a storage area 11, defined by the center console 8. Though the storage area 11 is depicted below the display 12, it can be disposed in various suitable areas within the passenger cabin 6.

The communication pad 10 is configured to wirelessly communicate with the portable device 4 disposed thereon. For instance, the communication pad 10 can be a near field communication (NFC) pad 10A having NFC sensors 10B disposed therein for performing wireless communication with the portable device 4. As the communication pad 10, the NFC pad 10A is configured to read a device ID or a tag of the portable device 4, which is unique to the portable device 4. When the portable device 4 is placed on the NFC pad 10A, the device ID unique to the portable device is read by the NFC pad 10A and provided to the in-vehicle system 2.

The communication pad 10 can also be configured as a charging pad having NFC sensors 10B disposed therein, such that the charging pad charges the battery of the portable device 4 disposed thereon and the NFC sensors 10B communicates with the portable device 4 positioned in close proximity to the NFC sensors 10B. Though the communication pad 10 is depicted within the storage area 11. The communication pad 10 can be arranged in various suitable areas within the passenger cabin 6, such as next to a gear shift, and can also be configured in various shapes and sizes suitable for wirelessly communicating with the portable device 4.

The display 12 displays information, such as text and images, to occupants of the vehicle. The display 12 may be an LCD display, or any other device suitable for displaying information, and may include a touch screen surface for receiving input from an occupant. The display 12 can also be used to access certain vehicular systems, such as climate control, navigation, and sound system. In addition, the display 12 can provide access to various functionalities supported by various subsystems of the in-vehicle system 2, such as hands-free communication, audio streaming, and internet access.

The portable device 4 can be any electronic device capable of wirelessly coupling with the in-vehicle system 2 by way of, for example, Bluetooth communication and/or NFC. For example, the portable device 4 can be a smartphone, a tablet computer, or a laptop. The portable device 4 can also be capable of wirelessly transmitting data to the in-vehicle system 2. Such data can include, for example, audio data, phonebook data, internet data, and navigation data.

The in-vehicle system 2 can include a control unit 13 having a CPU, a RAM, and a ROM for storing and executing various processes. Though the control unit 13 is depicted as being positioned behind the dashboard of the passenger cabin 6 in FIG. 2, the control unit 13 can be disposed in various suitable positions within the vehicle. The in-vehicle system 2 can include various sub-systems, such as a Bluetooth subsystem 14 and a NFC subsystem 16.

The Bluetooth subsystem 14 allows the in-vehicle system 2 to wirelessly communicate with other Bluetooth devices, such as the portable device 4, through, for example, a Bluetooth transceiver. To establish wireless communication, the Bluetooth subsystem 14 and the portable device 4 use standard Bluetooth protocol to form a bond that allows the two to automatically establish a communication link (i.e., a Bluetooth communication link) for wireless communication. Per standard Bluetooth protocol, in order to create a bond, the portable device 4 and Bluetooth subsystem 14 are first paired. For instance, the first time the portable device 4 is brought into communication range of the Bluetooth subsystem 14 of the in-vehicle system 2, the portable device 4 may send a Bluetooth communication request to the Bluetooth subsystem 14. Using standard Bluetooth protocol, a pin code is generated to authenticate the portable device 4. Once, the portable device has been authenticated, a MAC address is then stored by the portable device 4 and the Bluetooth subsystem 14, thereby allowing the two to identify each other once within communication range. Once pairing is complete, a bond if formed between the portable device 4 and the Bluetooth subsystem 14, thereby allowing the two to communicate with each other in the future without performing pairing. Various methods suitable for pairing the portable device 4 and the Bluetooth subsystem 14 can be used.

The NFC subsystem 16 can be configured to include the NFC sensors 10B provided in the NFC pad 10A or provided in other suitable areas in the passenger cabin 6. As part of the NFC subsystem 16, the NFC pad 10A communicates with the portable device 4 disposed thereon and detects the device ID unique to the portable device 4, which is provided to the in-vehicle system 2.

Various functions provided by the in-vehicle system 2 can be accessed by the portable device 4 once a communication link is established with the Bluetooth subsystem 14. For instance, a hands-free communication function can allow an occupant to operate the portable device through audio speakers and a microphone mounted within the passenger cabin 6. An audio streaming function plays audio files from the portable device 4 through the sound system of the vehicle. The audio files can be stored on the portable device 4 or, can even be files being streamed by the portable device 4 by way of an application (i.e., an App). An internet connection function can allow the occupant to access the Internet by way of the portable device 4. For instance, websites and data can be displayed on the display 12 of the vehicle, and the occupant may access the data or websites by way of the display 12 or any other suitable method, such as voice command.

Any portable device 4 brought into the vehicle can access the various functions of the in-vehicle system 2, once a bond is created between the portable device 4 and the Bluetooth subsystem 14. As a result, the in-vehicle system 2 distinguishes the portable devices 4 brought into the vehicle as either a primary device 4A or a secondary device 4B. The primary device 4A can be the portable device 4 of a primary user of the vehicle, such as an owner of the vehicle, whereas the secondary device 4B can be the portable device 4 of a guest, such as a friend or a colleague of the owner.

Figure 3:
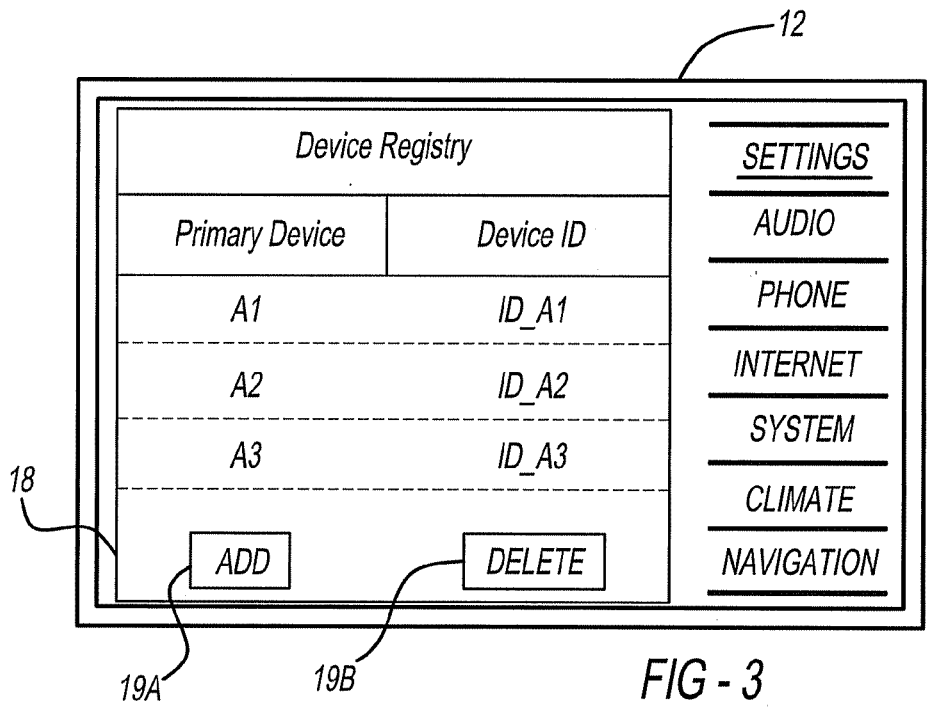
FIG. 3 illustrates a display of the center console displaying a device registry.

To identify the primary device 4A, the in-vehicle system 2 can include a device registry 18 for listing the device ID of the portable device 4 that are registered as the primary device 4A, as shown in FIGS. 1 and 3. Various methods can be used to register the portable device 4 as the primary device 4A. For example, under a setting option of the in-vehicle system 2, the occupant may access the device registry 18 and input the device ID of the portable device 4 using, for example, the display 12 or a website. For instance, in FIG. 3, the occupant may add or delete the entries in the device registry 18 by using operation buttons 19A, 19B. As another example, the occupant may also place the portable device 4 onto the NFC pad 10A or close to the NFC sensor 10B to provide the device registry 18 with the device ID. It should be understood that more than one portable device 4 can be registered as the primary device 4A. For example, the primary user can register a smartphone and a tablet computer as the primary device 4A. As another example, the primary user may include two individuals each having their own portable device 4 registered as the primary device 4A.

Figure 4:
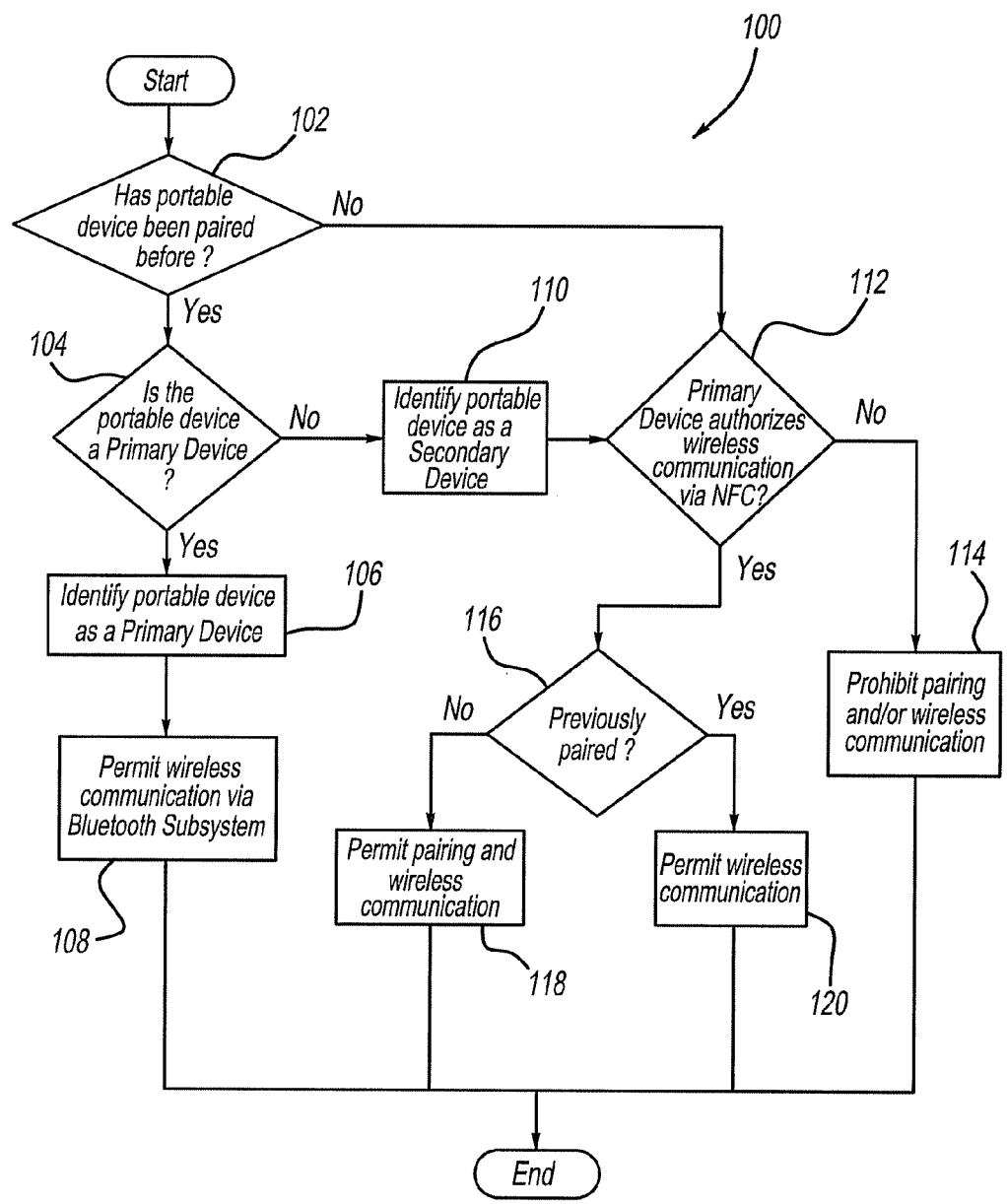
FIG. 4 is a flowchart of a communication authorization process in a first embodiment performed by the in-vehicle system of FIG. 1.

As portable devices 4 are brought into the vehicle, the in-vehicle system 2, via the control unit 13, performs a communication authorization process 100 provided in FIG. 4 once a communication request is received from the portable device 4. At 102 the in-vehicle system 2 determines whether the portable device 4 was previously paired with the Bluetooth subsystem 14. One way to determine this is by checking the MAC address that was saved by the portable device 4 and the Bluetooth subsystem 14. If the MAC address matches, the in-vehicle system 2 determines that the portable device 4 has been previously paired.

If the portable device 4 was previously paired, the in-vehicle system 2 then determines, at 104, whether the portable device 4 requesting communication is the primary device 4A. For instance, the in-vehicle system may compare the device ID stored in the device registry 18 with the device ID of the portable device 4 provided within the communication request. If the device registry 18 includes the device ID of the portable device 4, then the in-vehicle system 2, at 106, identifies the portable device 4 as the primary device 4A, and, at 108, permits wireless communication with the primary device 4A via the Bluetooth subsystem 14. If the device registry 18 does not include the device ID of the portable device 4, then the in-vehicle system 2 identifies the portable device 4 as the secondary device 4B, at 110.

To permit wireless communication via a communication link established by the Bluetooth subsystem 14, the in-vehicle system 2 determines whether the system 2 is authorized to communicate with the portable device 4 that has never been paired, as determined in 102, or with the secondary device 4B, as identified at 110. Such authorization can be provided by the primary device 4A via NFC.

Figure 5:
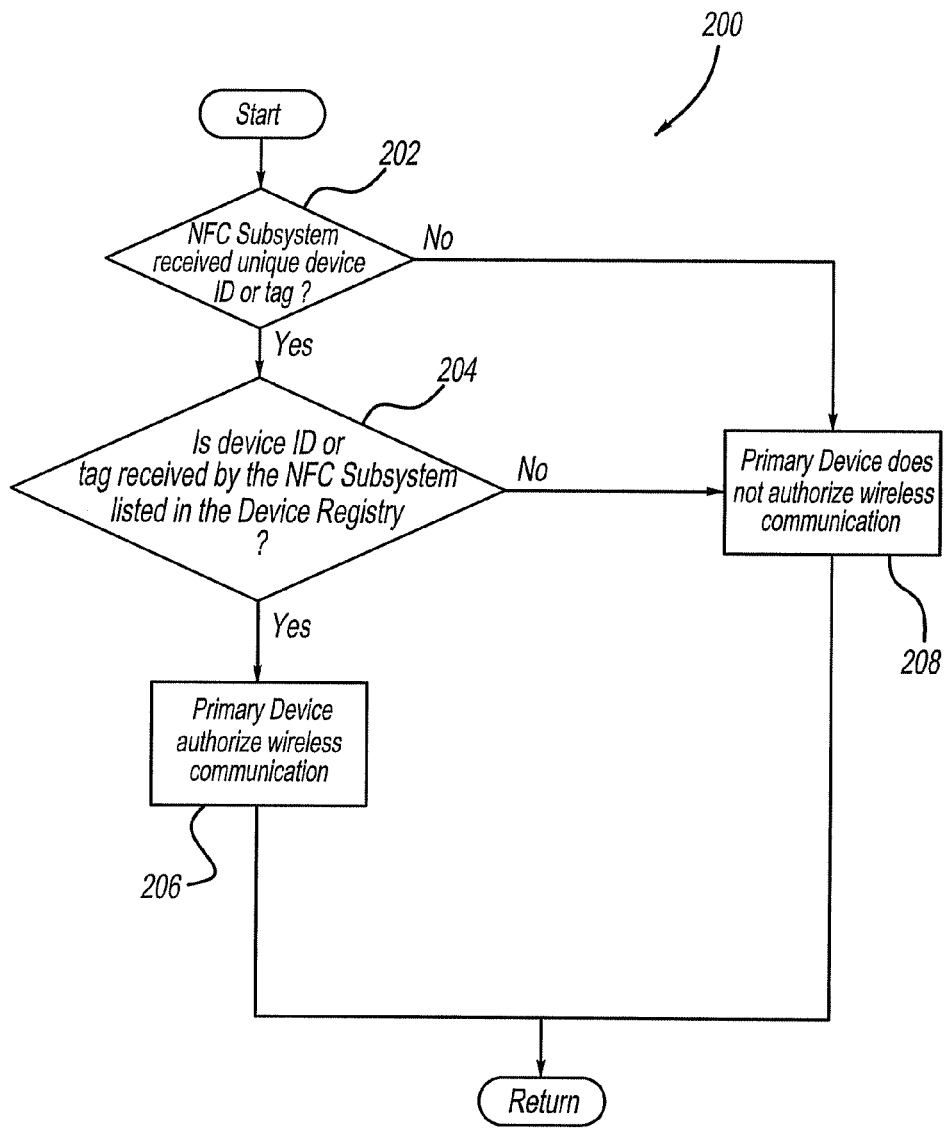
FIG. 5 is a flowchart of a primary device authorization process performed by the in-vehicle system as part of the communication authorization process of FIG. 4.

The in-vehicle system 2 can use the NFC subsystem 16 to determine if the primary device 4A authorizes Bluetooth communication at 112 by performing a primary device authorization process 200 of FIG. 5. For example, at 202, the in-vehicle system 2 determines whether the NFC subsystem 16 has received a device ID or tag. As provided above, the NFC subsystem 16 detects the portable device 4 and receives the device ID that is unique to the portable device 4 when the portable device 4 is disposed on the NFC pad 10A and/or is in close proximity to the NFC sensor 10B. Conversely, when the portable device 4 is not detected (i.e., not on the NFC pad 10A nor in close proximity to the NFC sensor 10B), no device ID is provided to the NFC subsystem 16.

Accordingly, when the NFC subsystem 16 receives a device ID, the in-vehicle system 2, at 204, determines whether the device ID received by the NFC subsystem 16 is listed in the device registry 18 as a primary device 4A. If the device ID is listed, the in-vehicle system 2, at 206, determines that the primary device 4A authorizes wireless communication via the Bluetooth subsystem 14 with the portable device 4 requesting communication, and returns to the communication authorization process 100 of FIG. 4. On the other hand, if the device ID is not listed in the device registry 18, the in-vehicle system 2, at 208, determines that the primary device 4A does not authorize the wireless communication and returns to the communication authorization process 100. In addition, if the NFC subsystem 16 did not receive a device ID, as determined at 202, the in-vehicle system 2, at 208, determines that the primary device 4A does not authorize the wireless communication, and returns to the communication authorization process 100.

Returning to the communication authorization process 100 of FIG. 4 at 112, in the event the primary device 4A has not authorized the wireless communication, as determined by process 200 of FIG. 5, the in-vehicle system 2, at 114, prohibits the Bluetooth subsystem 14 from establishing wireless communication with the portable device 4 requesting the wireless communication. Accordingly, the Bluetooth subsystem 14 and the portable device 4 may not be paired if pairing was not previously performed, and no communication link would be established.

When the primary device 4A does authorize wireless communication, the in-vehicle system 2, at 116, determines whether the portable device 4 requesting the wireless communication has been previously paired with the Bluetooth subsystem 14. If the portable device 4 was not previously paired, the in-vehicle system 2, at 118, permits the Bluetooth subsystem 14 to pair with the portable device 4 and to establish a communication link for wireless communication. When the portable device 4 has already been paired, the in-vehicle system 2, at 120, permits the Bluetooth subsystem 14 to establish a communication link for wireless communication with the portable device 4.

According to the present disclosure, the in-vehicle system 2 allows the primary user to authorize wireless communication between the in-vehicle system 2 and the secondary device 4B. In particular, the in-vehicle system 2 utilizes NFC as a medium for the primary user to provide authorization. As known, NFC can be established when two devices are in close proximity to each other. As a result, the primary user can consciously provide consent by positioning the primary device 4A in close proximity to the NFC sensor 10B by, for example, placing the primary device 4A onto the NFC pad 10A. Accordingly, in-vehicle system 2 authenticates the authorization by way of the NFC subsystem 16. Therefore, even if the secondary device 4B was previously paired with the Bluetooth subsystem 14, the secondary device 4B cannot automatically establish wireless communication with the Bluetooth subsystem 14, unless such communication is authorized by primary device 4A via the NFC subsystem 16.

Figure 6:
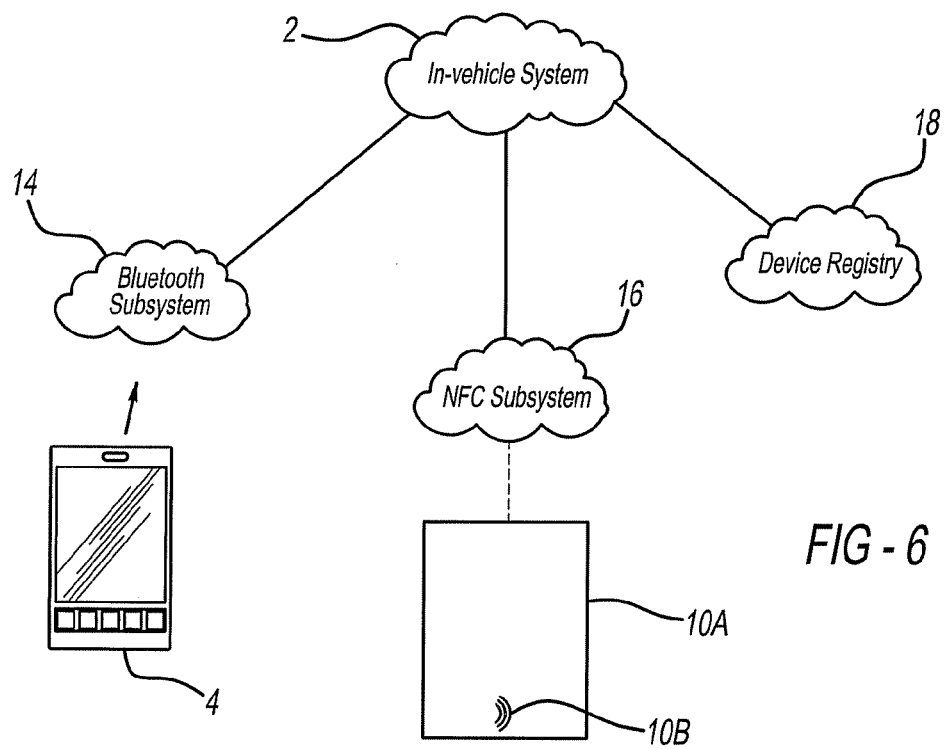
FIG. 6 illustrates a single portable device in communication range of the in-vehicle system.
Figure 7:
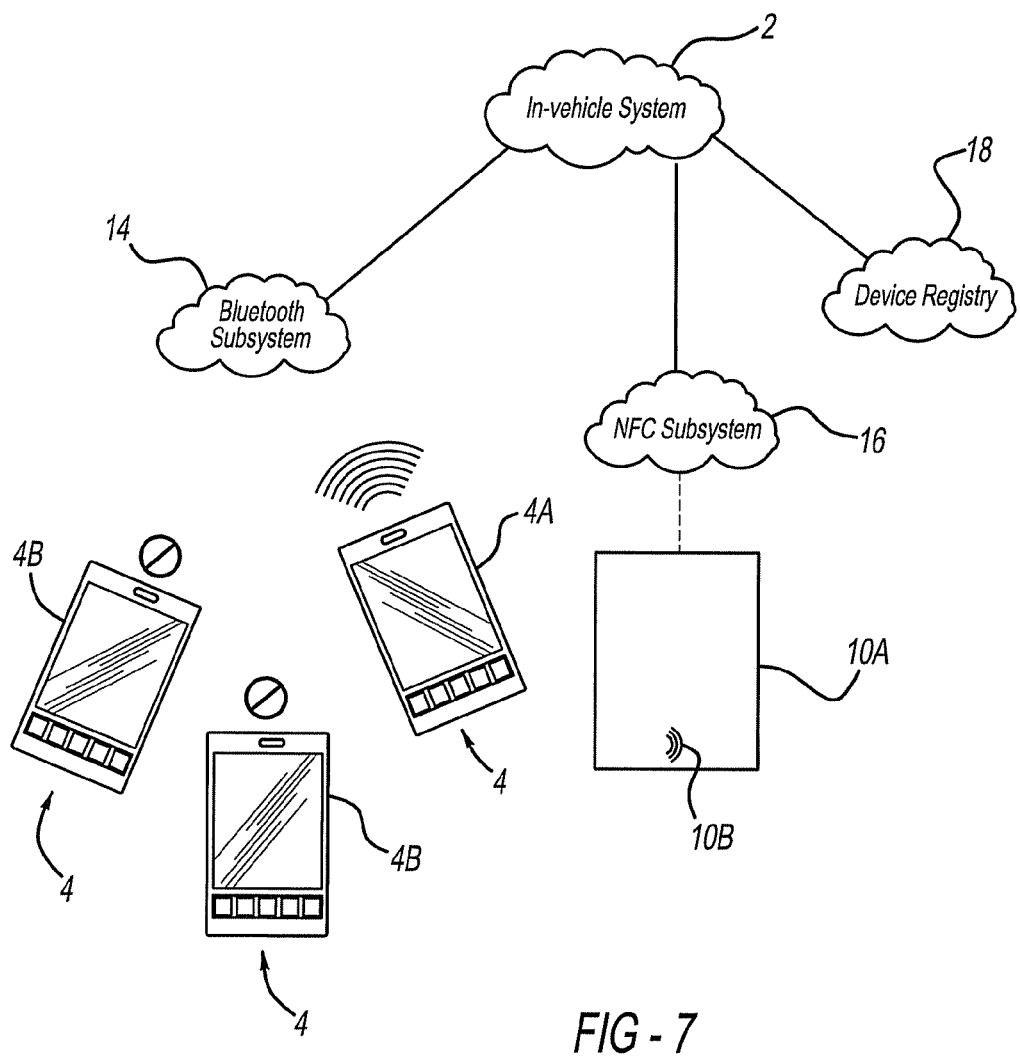
FIG. 7 illustrates multiple portable devices in communication range of the in-vehicle system where the in-vehicle system permits wireless communication with the primary device based on the processes of FIGS. 4 and 5.
Figure 8:
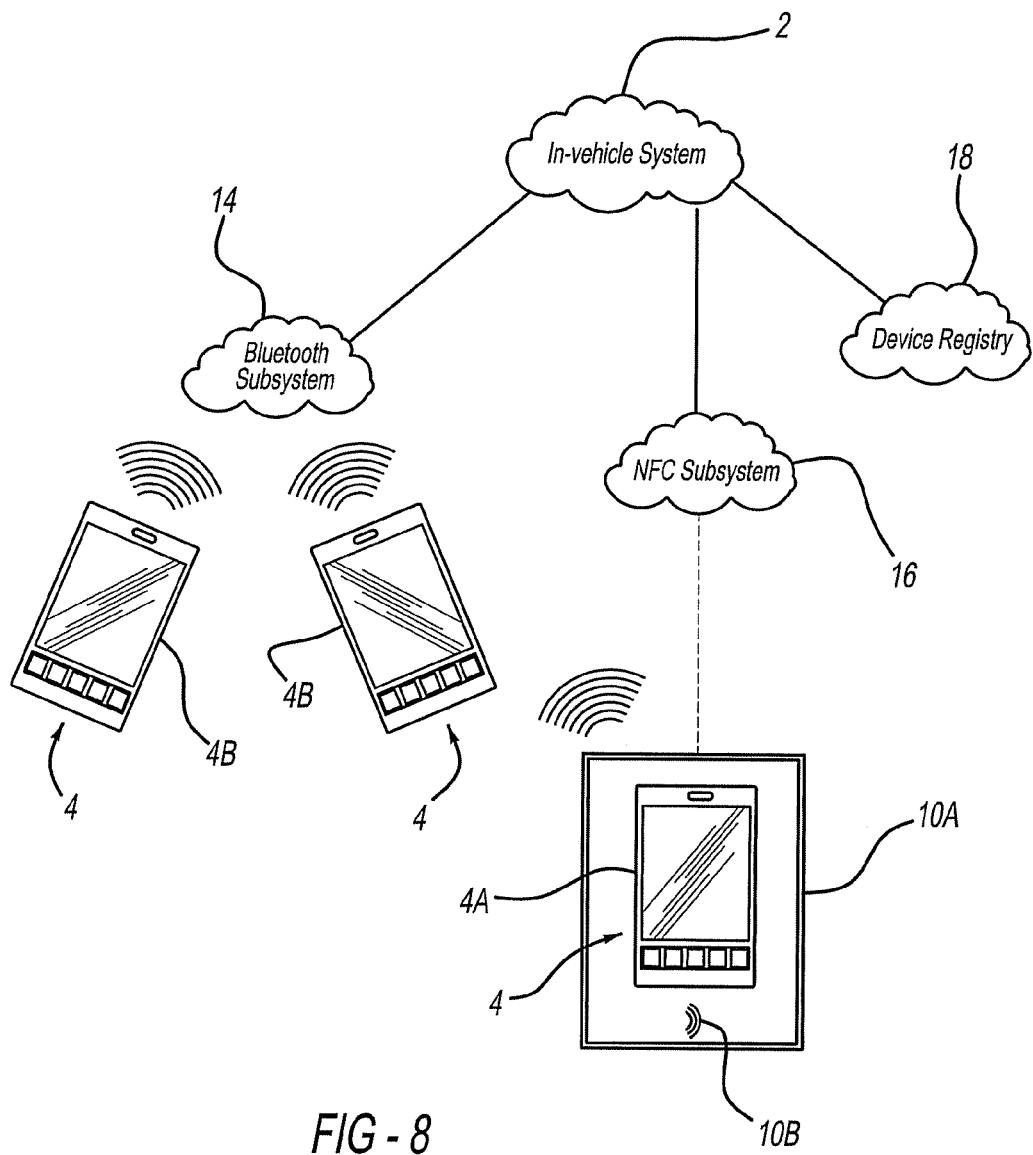
FIG. 8 illustrates multiple portable devices in communication range of the in-vehicle system where the in-vehicle system permits wireless communication with all of the portable devices based on the processes of FIGS. 4 and 5.

The communication authorization process 100 performed by the in-vehicle system 2 can further be understood by the illustrative examples shown in FIGS. 6-8. With reference to FIG. 6, the in-vehicle system 2 and the portable device 4 are depicted. The in-vehicle system 2 includes the Bluetooth subsystem 14, the NFC subsystem 16, the NFC pad 10A having the NFC sensors 10B, and the device registry 18. The portable device 4 requests wireless communication with the Bluetooth subsystem 14, as indicated by an arrow. Based on the process 100, the in-vehicle system 2 would permit communication if the portable device 4 is the primary device 4A, as determined by the device ID of the portable device 4 and the device registry 18. However, if the portable device 4 is the secondary device 4B, the in-vehicle system 2 would prohibit communication since wireless communication has not been authorized, as illustrated by the absence of the primary device 4A.

With reference to FIG. 7, which is similar to FIG. 6 accept multiple portable devices 4 are depicted, the in-vehicle system 2 would permit wireless communication with the primary device 4A via the Bluetooth subsystem 14 as indicated by the wavy lines. However, the in-vehicle system 2 would prohibit wireless communication with the secondary devices, as indicated by the no symbol, since authorization was not provided. In particular, though the primary device 4A is present, it has not been authenticated by the NFC subsystem 16, as illustrated by the primary device 4A not being positioned on the NFC pad 10A. Therefore, only the primary device 4A may wirelessly communicate with the in-vehicle system 2.

With reference to FIG. 8, the in-vehicle system 2 would permit wireless communication with all the portable devices 4 via the Bluetooth subsystem 14, including the secondary devices 4B, as indicated by the wave lines. Since the primary device 4A is present and is authenticated by the NFC subsystem 16, as illustrated by the primary device 4A being positioned on the NFC pad 10A, wireless communication between the in-vehicle system 2 and the secondary devices 4B has been authorized by the primary device 4A.

Figure 9:
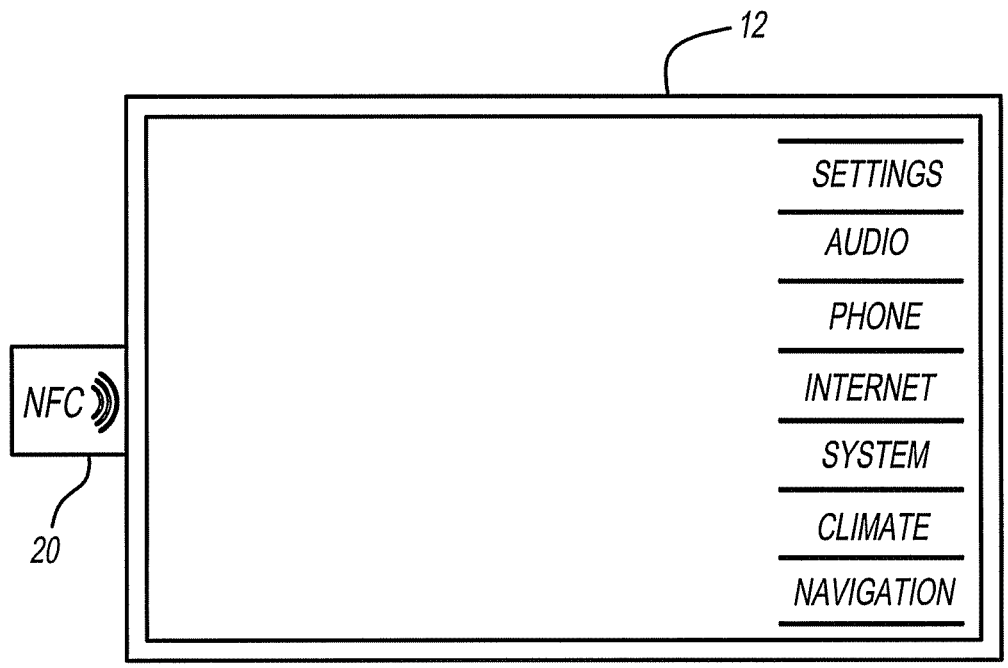
FIG. 9 illustrates a display having a NFC sensor.

The NFC subsystem 16 utilizes the NFC pad 10A for receiving the communication authorization from the primary device 4A. Alternatively, the NFC subsystem 16 may also utilize a NFC sensor 20 arranged in proximity to the display 12, as shown in FIG. 9. The NFC sensor 20 performs in the same manner as the NFC sensors 10B of the NFC pad 10A, in that once the portable device 4 is placed over and/or in close proximity to the NFC sensor 20, the sensor 20 detects the portable device 4 and receives the device ID unique to the portable device 4. Accordingly, to authorize wireless communication between the secondary device 4B and the in-vehicle system 2, the primary device 4A would be held in close proximity to the NFC sensor 20. Though the NFC sensor 20 is depicted close to the display 12, the NFC sensor 20 can be positioned at various suitable positions easily accessible by an occupant within the passenger cabin 6.

Figure 10:
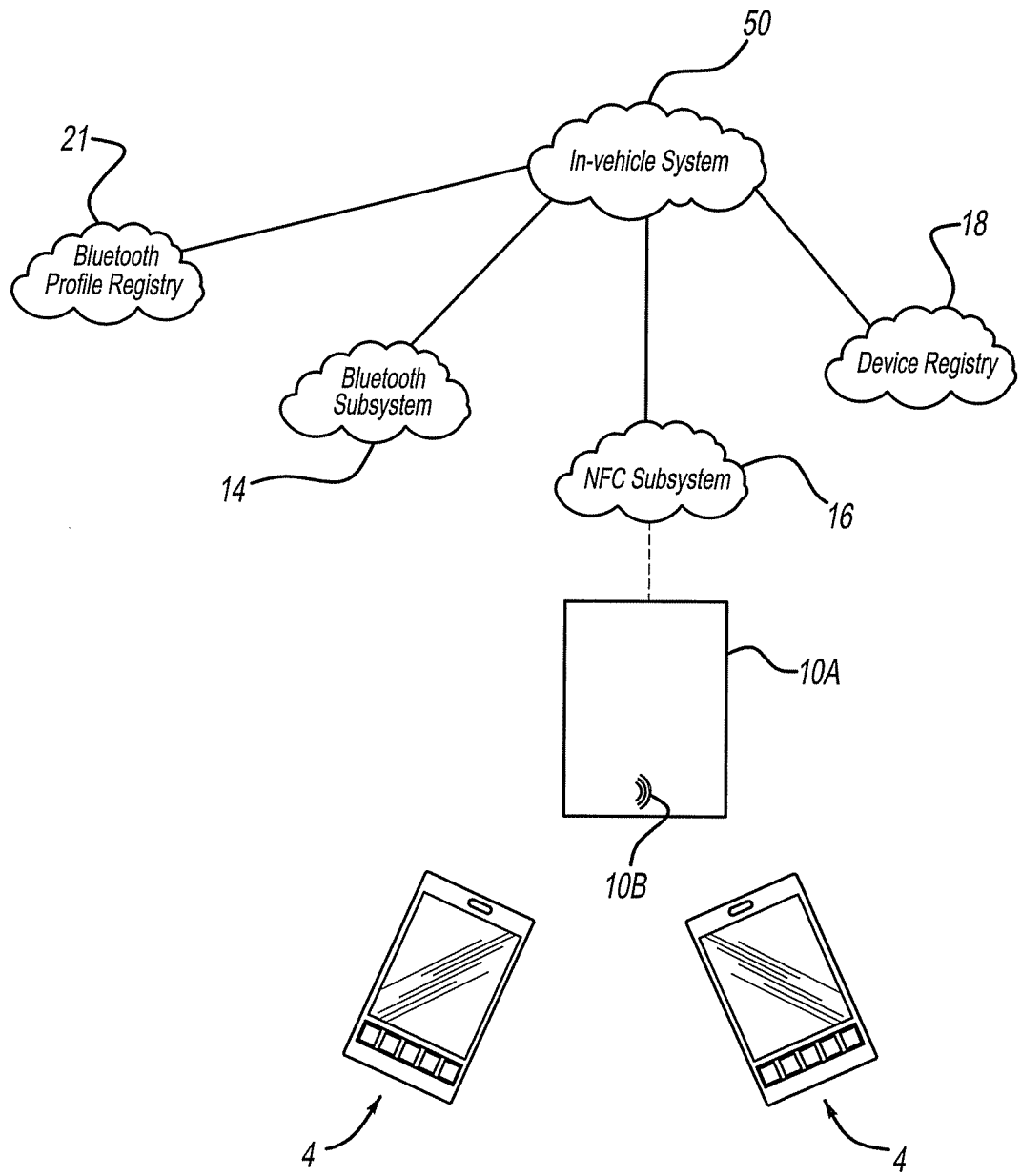
FIG. 10 illustrates an in-vehicle system in a second embodiment, which is within communication range of multiple portable devices brought into a vehicle having the in-vehicle system of the present disclosure.

In a second embodiment of the present disclosure, an in-vehicle system 50, illustrated in FIG. 10, can be customized by the primary user to permit guests to access certain wireless communication features. In other words, wireless communication maybe established between the secondary device 4B and the in-vehicle system 2, without the authorization of the primary device 4A, but such wireless communication would be limited to selected Bluetooth profiles.

Figure 11:
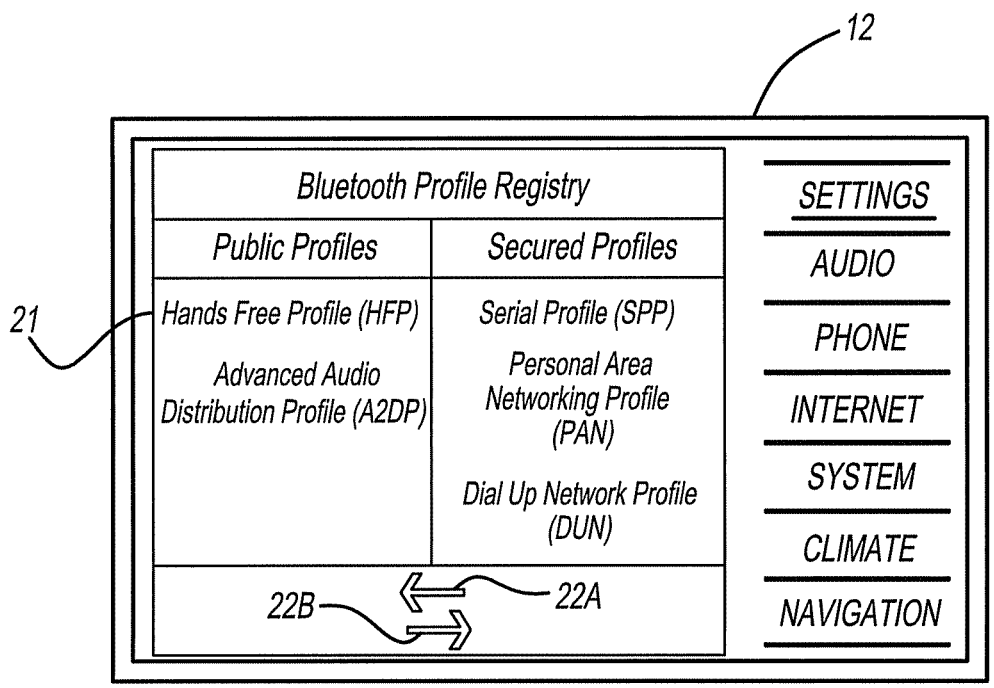
FIG. 11 illustrates the display of the center console displaying a Bluetooth profile registry.

The in-vehicle system 50 stores a list of Bluetooth profiles that have been identified as a public profile that can be accessible without the authorization of the primary device 4A. Such a list can be provided as a Bluetooth profile registry 21 that can be stored by the in-vehicle system 50. An example of the Bluetooth profile registry 21 is depicted in FIG. 11 where Bluetooth profiles are provide as either a public profile or a secured profile. A secured profile requires the authorization of the primary device 4A in order for communication to be established. In the example of FIG. 11, public profiles include hands free profile (HFP) and advanced audio distribution profile (A2DP). Whereas, secured profiles include serial port profile (SPP), personal area networking profile (PAN), and dial up network (DUN). It should be understood that various Bluetooth profiles can be registered in the Bluetooth profile registry 21, and are not limited to the ones shown in FIG. 11.

Various methods can be used to set selected Bluetooth profiles as either public or secured in the Bluetooth profile registry 21. For example, the occupant may access the Bluetooth profile registry 21 via a setting option of the in-vehicle system 50. Using the display 12, the user can select the Bluetooth profile, such as "SPP" in FIG. 11, and then operate a left arrow button 22A or a right arrow button 22B to move the Bluetooth profile to the appropriate column (i.e., "Public Profile" or "Secured Profile"). Such modification can also be made via a website. The Bluetooth profile registry 21 can also be a predetermined registry provided by the manufacturer.

Figure 12:
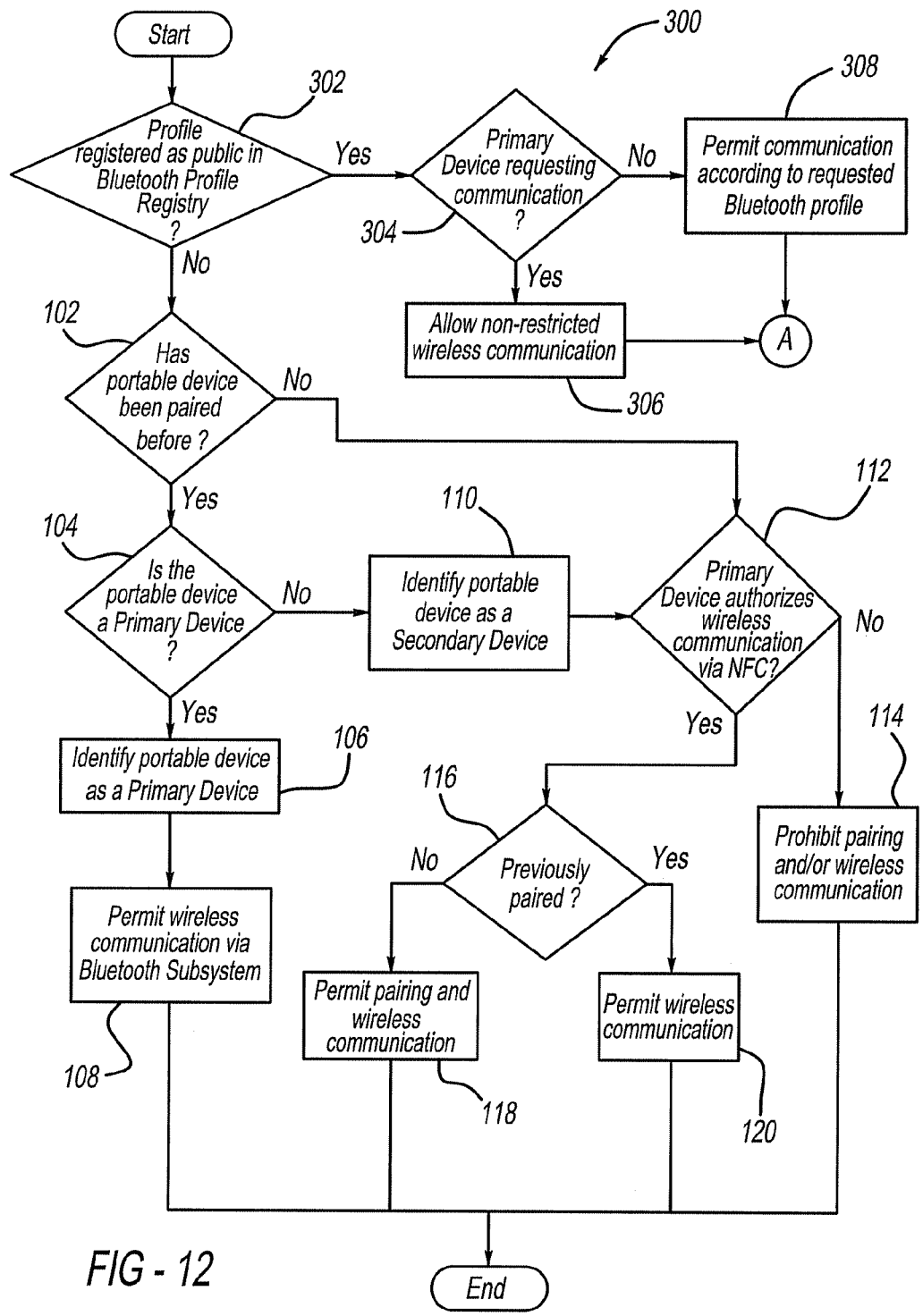
FIG. 12 is a flowchart of a communication authorization process in a second embodiment performed by the in-vehicle system of FIG. 10.

As portable devices 4 are brought into the vehicle, the portable device 4 may send a wireless communication request to the in-vehicle system 50 for establishing a certain Bluetooth profile. When such a request is received the in-vehicle system 50 performs a communication authorization process 300 of FIG. 12. The communication authorization process 300 is similar to the communication authorization process 100 of the first embodiment, where similar steps having similar reference numbers perform in the same manner as in the first embodiment.

When a request is received by the in-vehicle system 50, the system 50, at 302, determines whether the Bluetooth profile being requested is a public profile. In particular, the system 50 determines whether the profile requested is listed as "Public Profile" in the Bluetooth profile registry 21. If the profile is not listed as public, it is a secured profile that requires the authorization of the primary device 4A. Thus, the in-vehicle system 50 continues by performing the remaining process from 104 to 120, which is similar to the communication authorization process 100 of the first embodiment.

On the other hand if the profile is listed as a public profile, the system 50, at 304, then determines if the portable device 4 requesting the Bluetooth profile connection is the primary device 4A by determining whether the device ID received with the communication request is provided in the device registry 18, as described above. If the primary device 4A is requesting the connection, then the in-vehicle system 50, at 306, permits unrestricted wireless communication via the Bluetooth subsystem 14 (i.e., any profile, public and/or private, is assessable). When the portable device 4 is not the primary device 4A, the in-vehicle system 50, at 308, permits wireless communication according to the requested Bluetooth profile, which is a public profile.

The in-vehicle system 50 of the second embodiment allows secondary devices 4B to access certain functions supported by public Bluetooth profiles without requiring the authorization of the primary device 4A. The in-vehicle system 50 becomes customizable to permit limited access, free access, or no access by way of the Bluetooth profile registry, which can be set by the primary user. Thus, the in-vehicle system 50 can still be utilized by guests while providing the security benefits of the first embodiments for communication requests that are deemed to be restricted unless authorized by the primary device 4A via the NFC sub-system 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A method for securing wireless communication between an in-vehicle system and multiple portable devices brought into a vehicle, the method comprising:
    receiving a communication request from a requesting portable device, wherein the requesting portable device is one of the portable devices;
    determining whether a primary device has authorized wireless communication between the in-vehicle system and the requesting portable device, wherein the primary device is one of the portable devices that is registered in a primary device registry and the primary device provides authorization to the in-vehicle system by way of near field communication;
    establishing wireless communication between the in-vehicle system and the requesting portable device when the requesting portable device is the primary device; and
    establishing wireless communication between the in-vehicle system and the requesting portable device when the requesting portable device is a secondary device and the primary device has authorized wireless communication, wherein the secondary device is one of the portable devices that is not registered in the primary device registry;
    wherein the communication request received specifies a communication profile to be established, the method further comprising:
        determining whether the communication profile being requested by the requesting portable device is registered in a profile registry as a public profile or a secured profile;
        establishing wireless communication between the in-vehicle system and the requesting portable device when the communication profile requested is registered as the public profile in the profile registry; and
        establishing wireless communication between the in-vehicle system and the requesting portable device when the requesting portable device is the secondary device, the communication profile requested is registered as the secured profile in the profile registry, and the primary device has authorized wireless communication;
    wherein the secured profile is at least one of a serial port profile, a personal area networking profile, and a dial-up network; and
    wherein the public profile is at least one of a hands-free profile and an advanced audio distribution profile.

2. The method of claim 1, further comprising:
    determining a given portable device from among the multiple portable devices as the primary device when a device ID of the given portable device is provided in the primary device registry, wherein the primary device registry has device ID of the primary device listed therein and the given portable device is any one of the portable devices located in the vehicle; and
    determining the given portable device as the secondary device when the device ID of the given portable device is not provided in the primary device registry.

3. The method of claim 1, wherein determining whether the primary device has authorized wireless communication further comprises:
    receiving a device ID of one of the portable devices from a near field communication NFC sensor;
    comparing the device ID received from the NFC sensor to device ID provided in the primary device registry, which has device ID of the primary device;
    determining the primary device has authorized wireless communication when the device ID received from the NFC sensor is registered in the primary device registry;
    determining the primary device has not authorized wireless communication when the device ID received from the NFC sensor is not registered in the primary device registry; and
    determining the primary device has not authorized wireless communication when the NFC sensor has not received the device ID.

4. The method of claim 1 wherein the secondary device communicates directly with the in-vehicle system when wireless communication between the in-vehicle system and the secondary device is established.

5. The method of claim 1 wherein the in-vehicle system determines whether the primary device has authorized wireless communication between the in-vehicle system and the requesting portable device.

6. The method of claim 1 wherein the primary device provides authorization when the primary device is positioned on a near field communication pad, and the near field communication pad is disposed in the vehicle as part of the in-vehicle system.

7. The method of claim 1, further comprising:
    determining the requesting portable device as the primary device when a device ID of the requesting portable device is provided in the primary device registry, wherein the primary device registry has the device ID of the primary device listed therein; and
    determining the requesting portable device as the secondary device when the device ID of the requesting portable device is not provided in the primary device registry.

* * * * *